United States Patent [19]

Williams

[11] Patent Number: 5,519,200

[45] Date of Patent: May 21, 1996

[54] IDENTIFICATION AND INFORMATION STORAGE DEVICES

[75] Inventor: Edward W. Williams, Staffordshire, Great Britain

[73] Assignee: Keele University, Staffordshire, England

[21] Appl. No.: 325,343

[22] PCT Filed: Jun. 1, 1993

[86] PCT No.: PCT/GB93/01158

§ 371 Date: Oct. 28, 1994

§ 102(e) Date: Oct. 28, 1994

[87] PCT Pub. No.: WO93/24903

PCT Pub. Date: Dec. 9, 1993

[30] Foreign Application Priority Data

May 30, 1992 [GB] Great Britain ................. 9211506

[51] Int. Cl.$^6$ .................. G06K 19/00; G06K 7/10
[52] U.S. Cl. .................. 235/487; 235/462
[58] Field of Search .................. 235/449, 455, 235/462, 487, 488; 40/670; 283/81, 102; 369/47, 109, 284

[56] References Cited

U.S. PATENT DOCUMENTS

| | | | |
|---|---|---|---|
| 4,983,817 | 1/1991 | Dolash et al. | 235/491 |
| 5,367,148 | 11/1994 | Storch et al. | 235/375 |

FOREIGN PATENT DOCUMENTS 5234321  2/1992  Japan ......................... 360/2

*Primary Examiner*—Donald T. Hajec
*Assistant Examiner*—Minh Thien Le
*Attorney, Agent, or Firm*—Henderson & Sturm

[57] ABSTRACT

An identification and information storage device, for attachment to an article to be identified, includes: a magneto-optical strip, formed on a substrate and attached to the article, which is adapted to store first information readable by the reflecting and modifying of the polarization state of a light beam directed thereon; and an optically detectable pattern portion including an optical bar code for storing second information relating to the identification of the article, wherein the magneto-optical strip is positioned in a known location relative to the optical bar code such that on visual identification of the bar code the location of the magneto-optical strip can be found.

8 Claims, 4 Drawing Sheets

Encoding the message "1A"

USS 39 Character Structure

| Encoded Character | Binary Representation (B S B S B S B S B) |
|---|---|
| 1 | 1 0 0 1 0 0 0 0 1 |
| 2 | 0 0 1 1 0 0 0 0 1 |
| 3 | 1 0 1 1 0 0 0 0 0 |
| 4 | 0 0 0 1 1 0 0 0 1 |
| 5 | 1 0 0 1 1 0 0 0 0 |
| 6 | 0 0 1 1 1 0 0 0 0 |
| 7 | 0 0 0 1 0 0 1 0 1 |
| 8 | 1 0 0 1 0 0 1 0 0 |
| 9 | 0 0 1 1 0 0 1 0 0 |
| 0 | 0 0 0 1 1 0 1 0 0 |
| A | 1 0 0 0 0 1 0 0 1 |
| B | 0 0 1 0 0 1 0 0 1 |
| C | 1 0 1 0 0 1 0 0 0 |
| D | 0 0 0 0 1 1 0 0 1 |
| E | 1 0 0 0 1 1 0 0 0 |
| F | 0 0 1 0 1 1 0 0 0 |
| G | 0 0 0 0 0 1 1 0 1 |
| H | 1 0 0 0 0 1 1 0 0 |
| I | 0 0 1 0 0 1 1 0 0 |
| J | 0 0 0 0 1 1 1 0 0 |
| K | 1 0 0 0 0 0 0 1 1 |
| L | 0 0 1 0 0 0 0 1 1 |
| M | 1 0 1 0 0 0 0 1 0 |
| N | 0 0 0 0 1 0 0 1 1 |
| O | 1 0 0 0 1 0 0 1 0 |
| P | 0 0 1 0 1 0 0 1 0 |
| Q | 0 0 0 0 0 0 1 1 1 |
| R | 1 0 0 0 0 0 1 1 0 |
| S | 0 0 1 0 0 0 1 1 0 |
| T | 0 0 0 0 1 0 1 1 0 |
| U | 1 1 0 0 0 0 0 0 1 |
| V | 0 1 1 0 0 0 0 0 1 |
| W | 1 1 1 0 0 0 0 0 0 |
| X | 0 1 0 0 1 0 0 0 1 |
| Y | 1 1 0 0 1 0 0 0 0 |
| Z | 0 1 1 0 1 0 0 0 0 |
| - | 0 1 0 0 0 0 1 0 1 |
| . | 1 1 0 0 0 0 1 0 0 |
| SPACE | 0 1 1 0 0 0 1 0 0 |
| * | 0 1 0 0 1 0 1 0 0 |
| $ | 0 1 0 1 0 1 0 0 0 |
| / | 0 1 0 1 0 0 0 1 0 |
| + | 0 1 0 0 0 1 0 1 0 |
| % | 0 0 0 1 0 1 0 1 0 |

* denotes the special start/stop code character

Fig. 2

Prior Art

IDENTIFICATION AND INFORMATION STORAGE DEVICES

BACKGROUND OF THE INVENTION

1. Field of the Invention

The present invention relates to identification and information storage systems, and more particularly to bar code systems utilising a combination of optical, magnetic and magneto-optical methods of information storage.

2. Description of Prior Art and/or Background Information

It is now commonplace to use optically scanned bar codes to identify, articles upon which the bar code is printed, embossed, engraved or otherwise applied. In a typical application, such as the identification of products being sold in a supermarket, a plurality of bars having one of two possible widths are printed onto the merchandise according to a predetermined code in order to represent a combination of alphanumeric characters. An example of such a code is the USS Code 39 shown in FIG 1, where two alphanumeric characters are encoded using combinations of bars having one of two possible widths according to the binary representations indicated in the figure.

These bar codes are typically read by a laser scanning device, or light pen which passes over the bar code, the light reflected therefrom being detected by a sensor which converts the reflected light intensity pattern generated into a binary code.

It will be appreciated from the foregoing that in order to provide unique identification to more than several thousand articles, the number of bars, and the length of the bar code will have to increase. Thus, a fundamental problem with these bar codes is the limited quantity of information which may be stored in a given area. A further limitation is that they are generally printed permanently on the article and there is no possibility of conveniently updating the information carried thereon.

It is known in the field of disk drives and other magnetic recording media to use a magnetic layer on a substrate to record binary data patterns into the magnetic layer which may be read by a suitable means, and also, commonly may be written to to erase and/or update the information stored therein.

SUMMARY OF INVENTION

It is an object of the present invention to provide an identification and information storage device which is optically readable and which is further capable of storing and/or reading substantial additional data using magneto-optic techniques.

According to the present invention there is provided an identification and information storage device For attachment to an article to be identified comprising a magneto-optical strip formed on a substrate and attached to the article, said magneto-optical strip adapted to store first information readable by the reflecting and modifying of the polarization state of a light beam directed thereon characterized in that the storage device includes an optically detectable pattern portion comprising an optical bar code for storing second information relating to the identification of the article, and in that the magneto-optical strip is positioned in a known location relative to the optical bar code such that on visual identification of the bar code the location of the magneto-optical strip can be determined, characterized in that the storage device includes an optically detectable pattern portion comprising an optical bar code for storing second information relating to the identification of the article, and in that the magneto-optical strip is positioned in a known location relative to the optical bar code such that on visual identification of the bar code the location of the magneto-optical strip can be determined.

BRIEF DESCRIPTION OF DRAWINGS

The present invention will now be described in detail by way of example with reference to the accompanying drawings in which:

FIG. 2 shows a table indicating the encoding representations used in the prior art bar code of FIG. 1;

DETAILED DESCRIPTION INCLUDING PREFERRED EMBODIMENT

Figure 1:
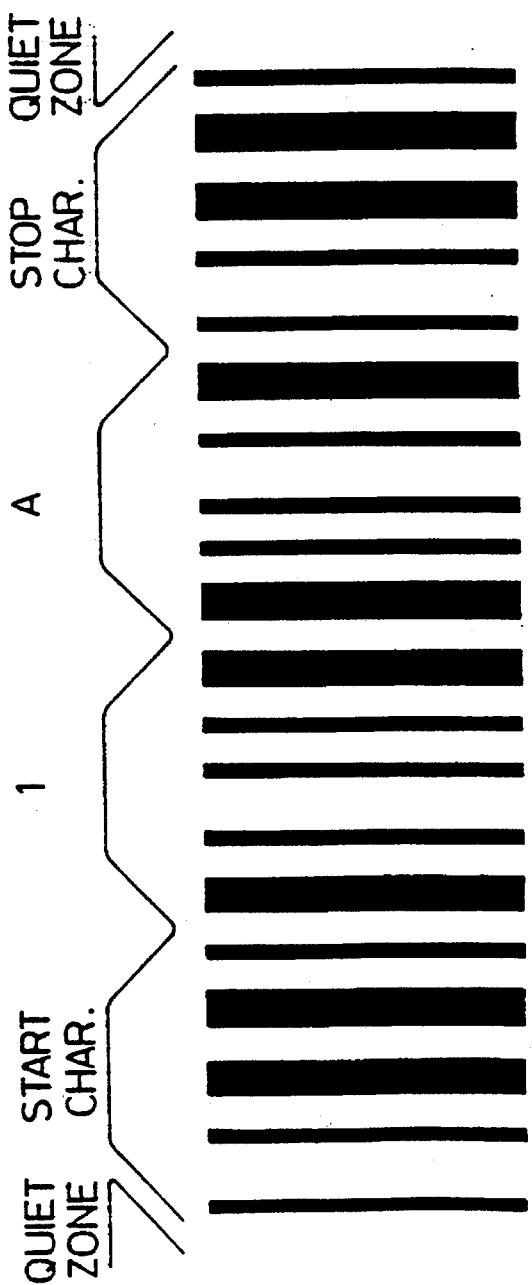
FIG. 1 shows an example of a prior art bar code.

According to one embodiment of the present invention, a conventional optical bar code, such as that depicted in FIG. 1, is modified to include a magneto-optical readable portion. At least one of the optical bar code, bars or spaces therebetween is formed from a suitable magneto-optical material, such as that now described with reference to FIGS. 3 and 4. Depending upon the quantity of information which it is desired to store in the bar code, more than one of the bars or spaces, or ultimately all of the bars and spaces, could be formed from this material.

A magneto-optic material device 20 is created by deposition of magneto-optic material onto a transparent polycarbonate substrate 22. Glass or plastic substrate films may also be used. Two, three, or four layers are deposited onto the substrate 22 using DC or RF sputtering techniques. The first layer 23 is a dielectric oxide or nitride which is used to optically couple laser light into the magneto-optic layer. In a presently preferred embodiment, aluminium nitride is used.

The second layer 24 is a magneto-optic layer sputter-deposited in an RF argon plasma from a target. Possible target materials include rare earth transition metals, cobalt-platinum alloys or cobalt-platinum multi-layers, or garnets. In a preferred embodiment, the layer is deposited from a sputter target with the composition of terbium, iron and cobalt in the proportions of 26 at. %, 66 at. % and 8 at. %, respectively. Successful depositions of magneto-optic layers have been carried out in sputter coating systems using an argon pressure properties are very strong and coercivities in the range of 250–1600 kA/m are achieved. The thickness of the magneto-optic layer may vary by approximately 5% and the substrate surface needs to be of sufficient smoothness to produce an "optical" quality film thereon.

The third layer, 25 is a protective dielectric layer such as aluminium nitride, and this will possibly not be required where the magneto-optic layer comprises a cobalt-platinum or garnet film.

The final layer 26 is a thick mirror coating of aluminium or any other reflective metal. This final layer is optional, since sufficient reflection occurs from the magneto-optic layer to produce a signal. In the illustration, the laser light is directed onto the material from above, through the substrate film 22.

Figure 4:
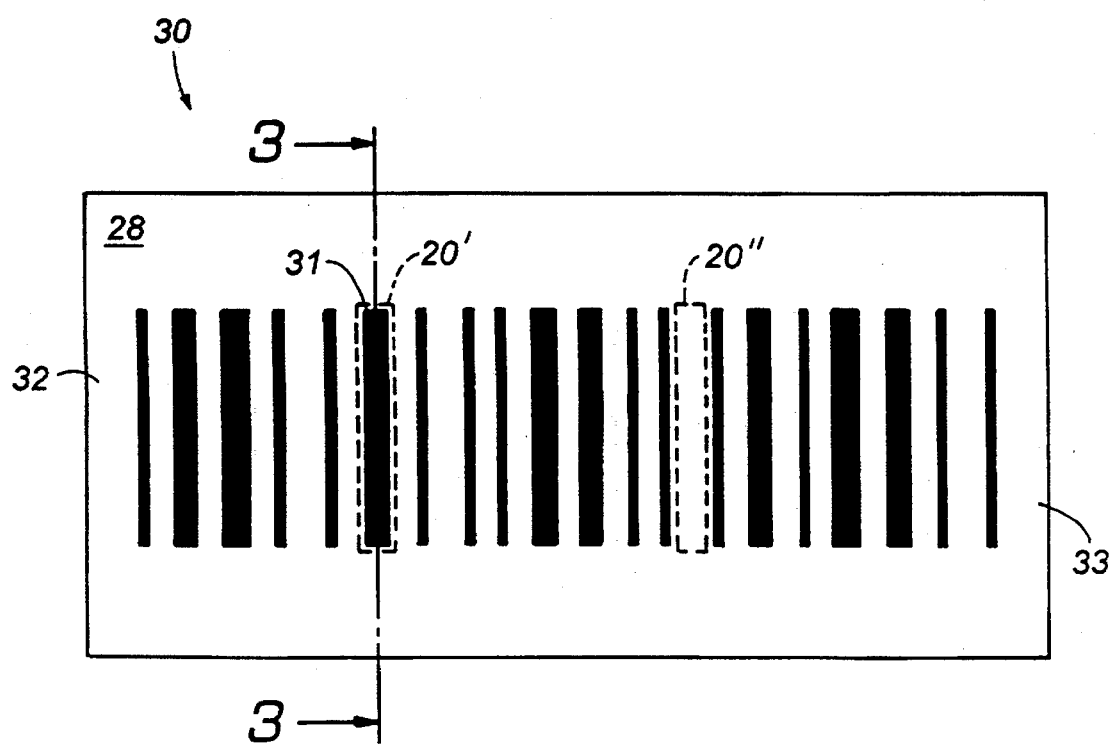
FIG. 4 shows in plan view an optical bar code including the magneto-optic material of FIG. 3.
Figure 5:
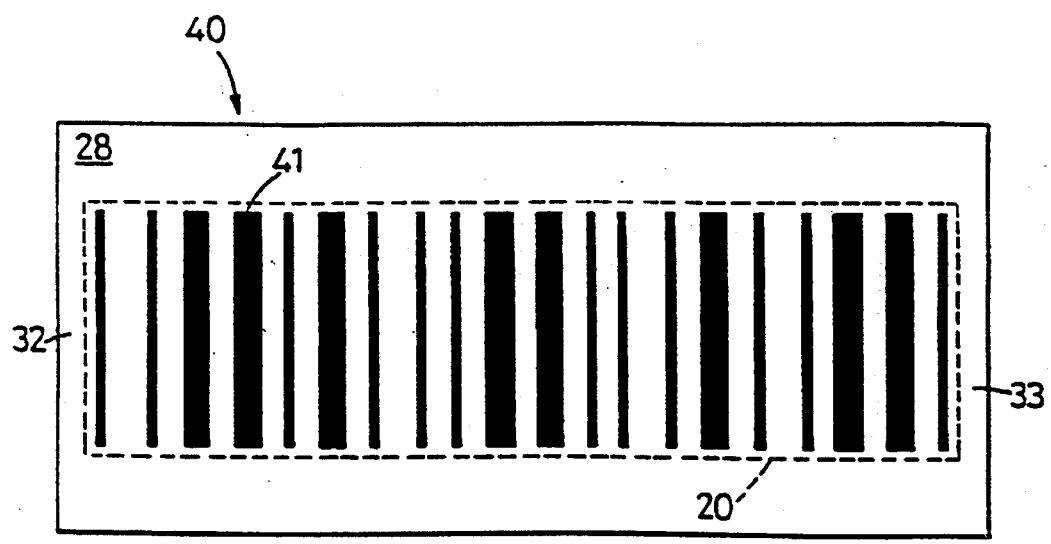
FIG. 5 shows in plan view an alternative embodiment of an optical bar code including the magneto-optic material of FIG. 3.

The device 20 may be attached to the product requiring identification by bonding or lamination techniques, such as use of an adhesion layer 27 to article surface 28. With reference to FIG. 4, the device 20 may form just one of the bars 31 of an optical bar code 30 as shown in dotted outline 20'. Alternatively, the device 20 may form a space between the bars of an optical bar code, as shown in dotted outline 20". With reference to FIG. 5, the device 20 may comprise the entire area of an optical bar code 40 overprinted with the optically read bars 41.

In the embodiment shown in FIG. 4, the magneto-optic device 20' or 20" is bonded by the adhesive layer 27 to a substrate 28 upon which the bar code 30 is printed. In FIG. 5, the magneto-optic device 20 forms the entire, or substantial part of the substrate upon which the optical bar code 40 with bars 41 is printed. Preferably, the optical bar code is scanned along its length in known manner, a ie. from end 32 to end 33 (FIGS. 4 and 5), and the magneto-optic code is scanned along the length of the bar ie. transversely to the optical scan direction.

The magneto-optic device may be deposited directly onto an object or article or identification using a mask or known photolithographic techniques. Deposition upon a wide range of substrates is possible, particularly where rare earth transition metals are being used.

The magneto optical recorded information is preferably recorded, as shown in FIG. 4, orthogonally with respect to the visible bar code. In order to store sufficient information a high density, fine resolution recording technique has been found to be necessary for example with a 1 micron resolution.

In order to obtain error free reading of the information it is essential to be able to identify the exact position of the magneto optic strip and to this end in a preferred embodiment the bar code itself is used to identify the exact location of the magneto optically recorded information.

Alternatively, the magneto optically recorded information 20' could be located at a precisely defined location within each bar code. The most convenient locations are within the start or stop characters which are always present within each bar code. Within each bar code a portion of the code could then be used merely to identify that magneto optic information was present and then the location of the magneto optic information would be known by the system as being within the start or stop character and at a defined location within such a character.

The identification of the exact location of the magneto optically recorded information for high resolution recording is equally important for the recording of the initial information and also the amendment of the information.

If the bar code is affixed to an object such as a bank (credit) card by, for example, a photographic process and is, therefore, extremely accurately positioned, then it may be possible by accurately positioning the card within a reader in both x and y directions to locate and read the magneto optically recorded information.

The advantage of using the visible bar code itself to identify the position of the magneto optical recorded information is if the bar code is attached to a flexible tape. The position of the magneto optic information can be pinpointed by the visible bar code. To obtain effective reading of the magneto optic information the tape during reading or recording would have to be held flat by suitable means. If the bar codes are produced on a strip of tape then they can be produced in quantity for affixing to a product being sliced to produce a plurality of magneto optic bar codes. The magneto optic information could be recorded prior to the visible bar code being affixed to the product and this will effect a production line process for the visible bar code and magneto optic recording. The identification of the positioning of the magneto optic stripe on the visible bar code enables the magneto optic information to be read and amended even if the visible bar code is not affixed to the product in an accurate manner.

Figure 3:
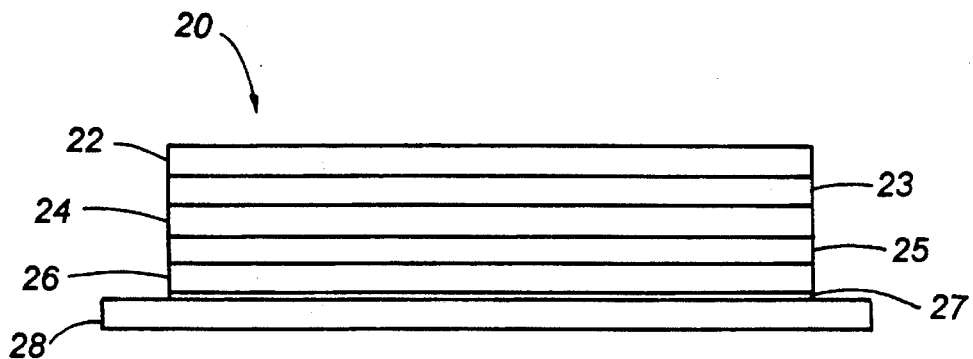
FIG. 3 shows a cross-section of a magneto-optic material according to the present invention which also represents a section on line A—A in FIGS. 4 and 5.
Figure 6:
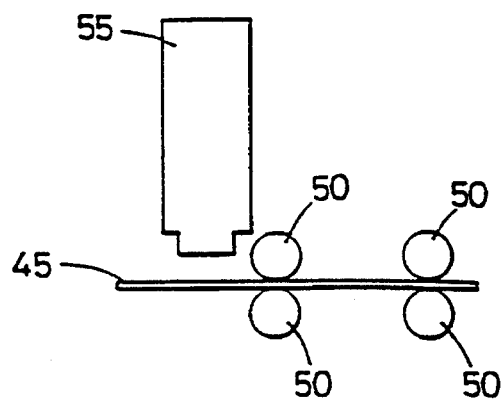
FIG. 6 shows in diagrammatic form the side view of a card reader according to the present invention.
Figure 7:
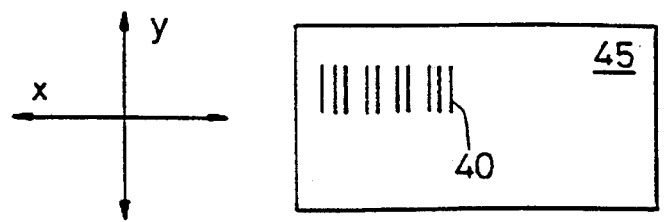
FIG. 7 shows in diagrammatic form the plan view of the card reader of FIG. 6.

To read or record the magneto-optic bar code a servo controlled reader and an optical head may be used. An exemplary arrangement of such a system is represented in FIGS. 6 and 7 for use as a card reader. A card 45 carrying a bar code 40 would pass under an optical and magneto-optical head 55 in the x-direction in order to scan the optical code from end 32 to end 33 (FIG. 3). Positional information derived from the optically scanned bar code would then be used to stop the card under the optical head at an appropriate bar or space in the bar code which is to be scanned magneto-optically. The optically read portion thus acts as a tracking guide to position the magneto-optic reading head 55 correctly. At this point the magneto-optical head would activate and a servo control would scan the head across the bar in the y-direction reading and/or writing data on the magneto-optic portion.

Recording or erasing the magneto-optic bar codes is carried out in the presence of a magnetic field by a visible or non-visible (ie. infra-red) laser. The laser heats one small spot of the magneto-optic layer to a temperature of approximately 150°–200° C. and the field records or erases depending upon the orientation of the applied magnetic field which is perpendicular to the layer surface. Reading the magneto-optic bar code requires a change in polarization state and reflectivity of a beam directed at the magneto-optic layer to be measured. Linearly or circularly polarized laser radiation is directed toward the magneto-optic layer, and the polarization state of the circularly or elliptically polarised beam reflected therefrom is measured. For example, the polarization E-vector rotates in a clockwise direction to represent one binary state and in an anti-clockwise direction for the other binary state and can be measured using techniques well known in the art.

It will be understood that the same head used to scan the magneto-optic portion of the bar code could also scan the optical portion. In the former case, the polarization state of the reflected light is measured: in the latter case the reflectivity alone is measured. It will be recognized that the resolution required of the y-direction servo positional control is much greater while scanning the magneto-optic portion than that required for the positional control when reading the optical portion.

The presence of the magneto-optic clement in an optically read bar code provides a number of advantages. As has already been discussed the quantity of information which may be recorded by way of the bar code may be greatly increased. Typically a single optical bar code bar may be of sufficient area to provide storage capacity of 50 k bytes. Thus the magneto-optic portion may provide detailed information about the article upon which the optical bar code resides. This information is erasable/re-writable and thus can be updated to indicate changes in status of the article. Examples may include test data during manufacture ownership record and/or sales of the item. This information is also effectively concealed in that it is not evident to an optical system and may only be read by an appropriate reader. The quantity of information which may be stored on the magneto-optic portion of the bar code may also be used to provide a vast increase in the number of unique identification codes available to any type of bar code system.

The technique may be suitably applied to credit cards and the like to provide additional information on the card and card holder status beyond the mere identification of the card number. Thus the card number (or account number) may be provided on the card as a bar code which is not alterable and further data may be stored on the card using the magneto-optic portion which is alterable by the appropriate read/write head. Card transaction information creditworthiness or even personal identification data might be stored therein. Such personal identification information might be used to permit confirmation of the identity of the card holder (eg. fingerprint or photograph data) thereby providing additional security against misuse of the card.

It will be understood that the magneto-optic portion of a bar code identification system need not be exactly superimposed on the optical bar code, but could be adjacent thereto in some fixed relationship enabling the magneto-optical head to track to the correct x-y position on the article. It will also be understood that the magneto-optic scan direction need not necessarily be orthogonal to the optical scan direction.

A further advantage of one embodiment of the present invention is that the bar code including magneto-optic portion may be "backwards compatible" with existing bar code readers. If the optically readable bar code does not provide a key to the location of a magneto-optic portion, then the reader will simply process the bar code according to prior art systems. If, however, the bar code identifies the presence of a magneto-optically readable portion, the reader may switch modes to read this portion.

It will also be understood that provided accurate positioning of the magneto-optical read/write head can be achieved without the use of an optically read pattern such as the bar code, the optically read pattern may be omitted altogether, and be referenced to, for example, the edge of the article.

The optically scanned pattern could be replaced with, for example, a magnetically scanned code which provides a positional reference to the magneto-optically scanned pattern.

What is claimed is:

1. An identification and information storage device for attachment to an article to be identified comprising a magneto-optical strip formed on a substrate and attached to the article, said magneto-optical strip adapted to store first information readable by the reflecting and modifying of the polarization state of a light beam directed thereon, characterized in that the storage device includes an optically detectable pattern portion comprising an optical bar code for storing second information relating to the identification of the article, and wherein the magneto-optical strip is positioned in a known location relative to the optical bar code such that on visual identification of the bar code the location of the magneto-optical strip can be found.

2. An identification and information storage device as claimed in claim 1 in which the position of the magneto-optical strip is determined by decoding the bar code to provide a location relative to the bar code.

3. An identification and information storage device as claimed in claim 1 in which the position of the magneto-optical strip is in a fixed relationship to the start and/or stop characters of the bar code.

4. An identification and information storage device as claimed in claim 1 in which the bar code also identifies if there is any magneto-optical information present, the location of the magneto-optic information then being predetermined relative to the start or stop characters.

5. An identification and information storage device as claimed in claim 1 in which the magneto-optical strip is located immediately below one of the bars in the bar code.

6. An identification and information storage device as claimed in claim 1 in which the device is formed on a flexible tape.

7. An identification and information storage device as claimed in claim 6 in which a plurality of the devices are formed in a continuous manner on an elongated strip.

8. An identification and information storage device as claimed in claim 1 in which the device comprises multiple layers deposited in the order of a first transparent polycarbonate substrate, a dielectric oxide or nitride optical coupling layer, a magneto-optical layer, a protective dielectric layer, a mirror coating layer, and an adhesion layer for adherence to the surface of an article.

* * * * *